Nov. 7, 1950     B. MARCELLUS     2,528,766
TIME CONTROLLED ACTUATOR

Filed Oct. 10, 1945     4 Sheets-Sheet 1

INVENTOR.
Brooks Marcellus
BY
Carlson, Pitzner, Hubbard & Wolfe
ATTORNEYS

Nov. 7, 1950   B. MARCELLUS   2,528,766
TIME CONTROLLED ACTUATOR
Filed Oct. 10, 1945   4 Sheets-Sheet 2

INVENTOR.
Brooks Marcellus
BY
ATTORNEYS

Nov. 7, 1950   B. MARCELLUS   2,528,766
TIME CONTROLLED ACTUATOR
Filed Oct. 10, 1945   4 Sheets-Sheet 3
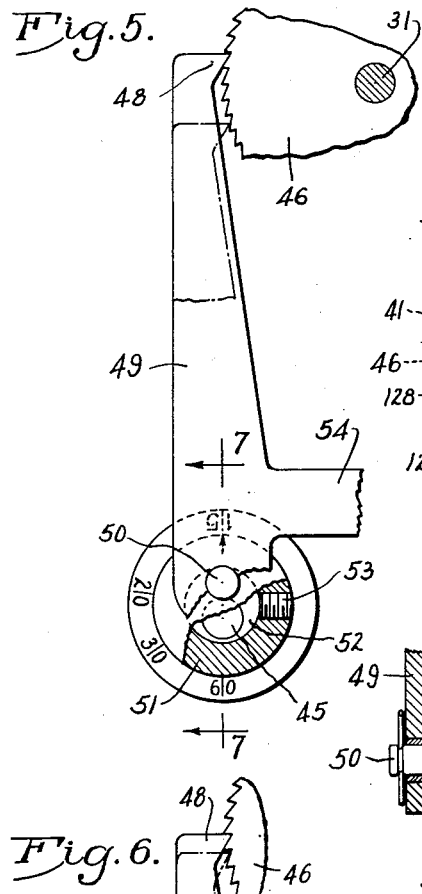
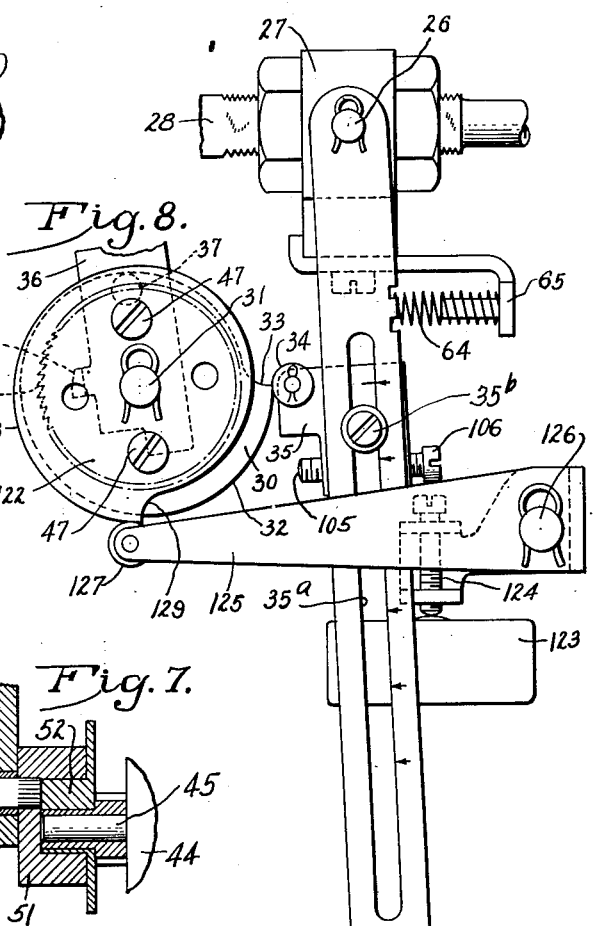
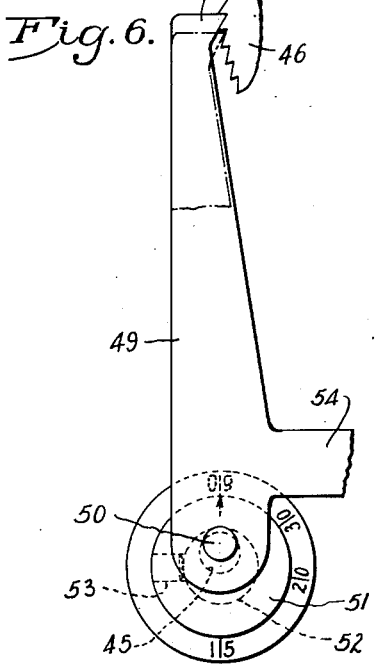
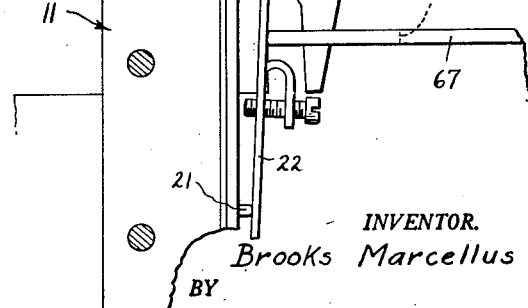
INVENTOR.
Brooks Marcellus
BY
ATTORNEYS Nov. 7, 1950   B. MARCELLUS   2,528,766
TIME CONTROLLED ACTUATOR
Filed Oct. 10, 1945   4 Sheets-Sheet 4

INVENTOR.
Brooks Marcellus
BY
Carlson, Pitzner, Hubbard & Wolfe,
ATTORNEYS

Patented Nov. 7, 1950

2,528,766

UNITED STATES PATENT OFFICE 2,528,766

TIME CONTROLLED ACTUATOR

Brooks Marcellus, Rockford, Ill., assignor to Barber-Colman Company, Rockford, Ill., a corporation of Illinois Application October 10, 1945, Serial No. 621,503

26 Claims. (Cl. 161—1)

This invention relates to a time controlled mechanism for actuating a control device such as a switch to program the cyclic operation of a controlled apparatus such as the burner of a heater for a building. The invention has more particular reference to mechanisms of this character in which the cyclic operation of the control device is modified in response to temperature or other condition changes.

A general object is to provide a cycling mechanism of the above character which is simpler in construction, more reliable in operation, and more versatile in its adaptation to service requirements than similar mechanisms heretofore used.

A more detailed object is to provide for actuation of a switch or other control device in a novel manner by the combined action of time controlled cycling and program cams modified in their action by a condition responsive element so as to be capable of controlling a heating system to produce day and night cycling variable with condition changes, morning warm-up, and week end depression of the building temperature.

Another object is to provide a novel mechanism for modifying the action of the normal cycling mechanism to produce night operation.

A further object is to override the day control in a novel manner in order to produce morning warm-up.

Still another object is to provide a novel drive for the cycling cam which facilitates the performance of the auxiliary functions and greatly simplifies the mechanism required.

The invention also resides in the novel structural character of the mechanisms employed for producing night set-back, restoration of day operation, hold-fire control in the case of stoker installations, and week-end depression of the building temperature.

Another object is to drive the programming and timing cams from a common motor connected to the timing cam through a connection which may be disengaged to delay the timing of the heat "on" period until the remote parts of the heating system are conditioned to supply heat.

Another object is to provide a novel means for adapting the control mechanism for operation in different localities.

Other objects and advantages of the invention will become apparent from the following detailed description taken in connection with the accompanying drawings, in which:

Figs. 5 and 6 are fragmentary views of the mechanism for driving the timing cam.

Fig. 7 is a section taken along the line 7—7 of Fig. 5.

Fig. 8 is an enlarged view of the timing cam and the mechanism actuated thereby.

Figure 1:
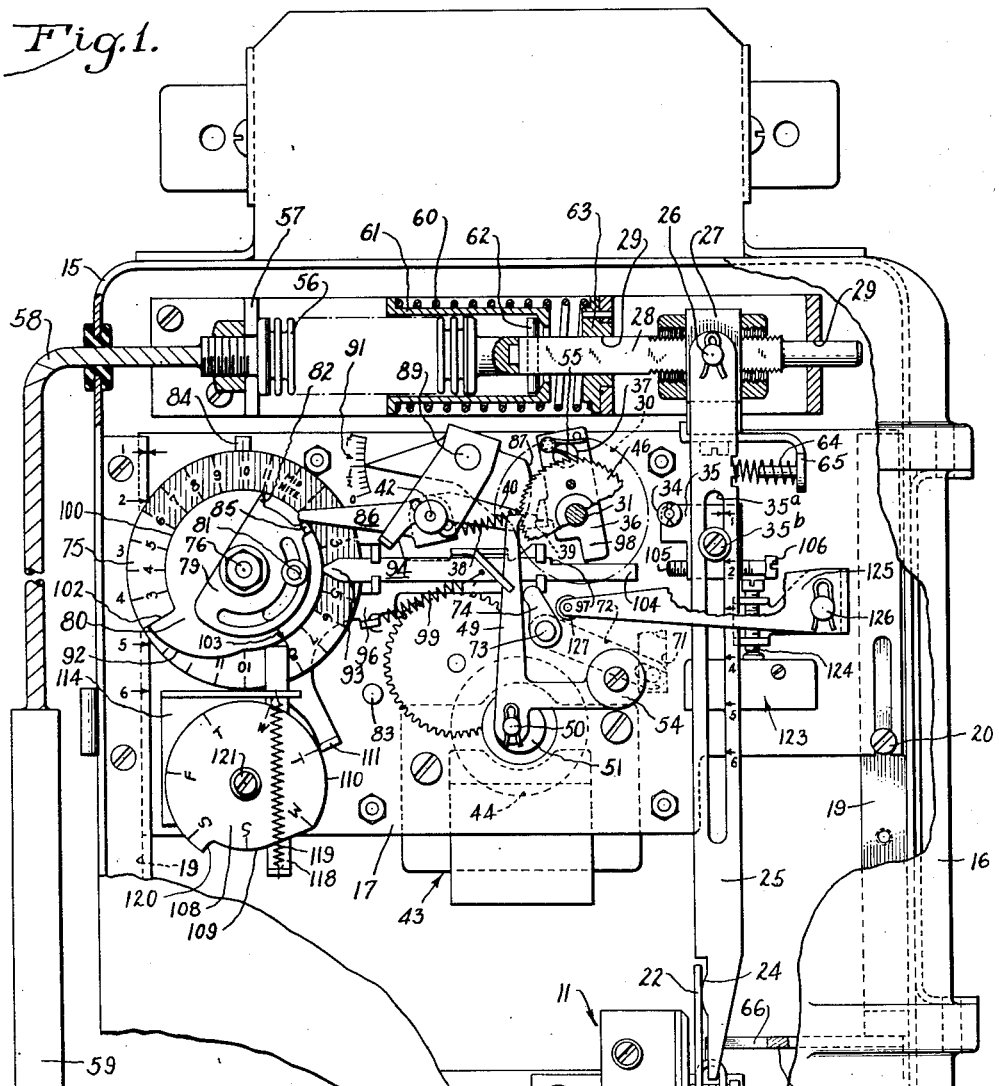
Figure 1 is a front elevational view of a time controlled actuator embodying the present invention, with the cover and certain of the parts broken away and shown in section.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The mechanism shown in the drawings for purposes of illustration is especially adapted for use in governing the supply of heat to a building to maintain a uniform temperature therein during periods of occupancy while effecting an optimum saving in fuel, and this, without the necessity of employing a room thermostat in the building. In general, a control device in the form of a switch 11 is actuated intermittently in accordance with a predetermined daily and weekly program which is especially suited to control the operation of a building heating system that may be turned on and off by closure and opening of the switch. The cyclic operation is such that during the daytime, heat is supplied to the building during spaced time intervals which may be varied in length automatically in accordance with changes in the temperature outside of the building. At a selected time in the evening, a control is adjusted automatically to allow the building temperature to become depressed to a predetermined selected value until morning when the heat is turned on continuously to warm up the building to normal temperature by a predetermined time. For certain installations, night setback action is omitted while for others, such as office buildings, night operation may be continued over the weekend in order to conserve fuel.

Figure 9:
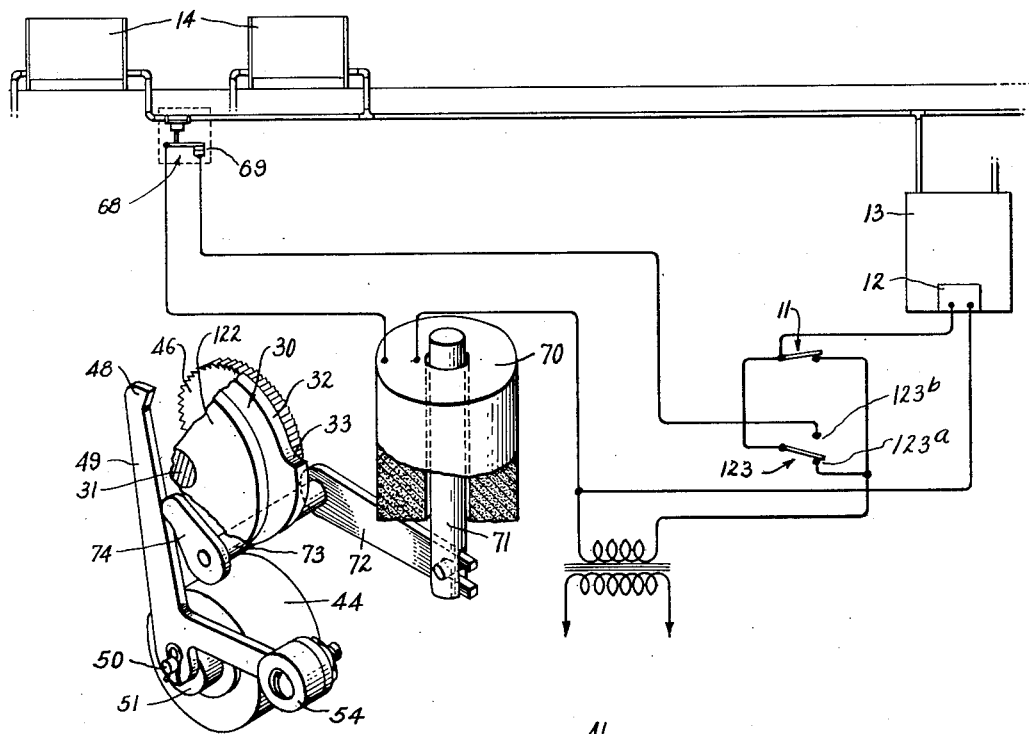
Fig. 9 is a schematic view and wiring diagram of a heating system controlled by the present actuator, part of which is shown as a fragmentary perspective.

The closure of the switch 11 may, as illustrated in Fig. 9, be utilized to initiate operation of a heater such as the burner 12 of a boiler 13 for supplying heat to a fluid conveyed through piping to exchangers 14 in the rooms of a building to be heated. The operation of the burner continues until the switch 11 is again opened.

The apparatus for carrying out the foregoing general functions is mounted within a box-like casing 15 adapted to be mounted in vertical position and having a hinged cover 16 and a main frame plate 17 resting on ledges 19 inturned from opposite side walls of the casing and clamped thereto by a screw 20. All of the major operating parts are supported on this frame plate which, for a purpose to appear later, is adjustable along the ledges 19.

The main control switch 11 is a so-called Microswitch of the normally closed type having coacting contacts one of which is moved with an over-center action to effect closure or opening of the switch in response to a small movement of an actuating pin 21 projecting from the casing. The latter is rigidly mounted on a cross plate at the bottom of the casing with its actuating pin normally urged outwardly for engagement with an arm 22 pivoted at 23. The upper free end of this arm bears at 24 against one end of a floating lever 25 whose other end is pivoted at 26 on a block 27 adjustably secured to a horizontal rod 28 mounted in horizontal guides 29 on the casing.

Means is provided for swinging the lever 25 alternately to the right about the pivot 26 out of switch-open position to switch-closed position and to the left to switch-open position so as to time the periods of opening and closure of the switch and thereby determine the relative lengths of the periods during which the burner is "off" and "on." This means comprises a timing cam 30 of the open face type rotatable on a pin 31 and having a gradual peripheral rise 32 and an abrupt fall 33 engageable with a follower roller 34 mounted on a block 35 adjustable along a slot 35ª in the lever 25 and secured to the latter by a clamping screw 35ᵇ. For a purpose to appear later, the cam 30 is mounted for bodily horizontal movement back and forth longitudinally of the path in which the follower 34 moves in opening and closing the switch and transversely of the motion of the pawl 49. This is accomplished herein by mounting the pin 31 on the free end of a crank arm 36 pivoted on a stud 37 which projects forwardly from the frame plate 17. A contractile spring 38 acting on the arm tends to swing the cam away from the position shown in Figs. 1 and 2, such motion being prevented by engagement of a shoulder 39 on a latch 40 with a lug 41 depending from the cam suporting arm. The latch is pivoted on a stud 42 on a frame plate and is connected eccentrically of its pivot to the other end of the tension spring 38 so as to be urged thereby to latching position.

Mounted on and beneath the frame plate 17 is a timing motor 43 preferably of the electric synchronous type operating through speed reduction gearing within a case 44 to turn a shaft 45 (Fig. 7) at a speed of one revolution per minute. The shaft is arranged to drive the timing cam 30 through a connection of adjustable transmission ratio and selectively engageable and disengageable so that the drive may be interrupted under certain conditions. Such a connection is formed in the present instance by a pawl and ratchet drive including a sixty tooth ratchet wheel 46 rotatable on the pin 31 and connected by screws 47 to the under side of the cam 30. The teeth are inclined for clockwise rotation of the wheel and are engageable by the tip 48 of an elongated pawl 49 projecting upwardly from an eccentric pin 50 on which the pawl is pivoted. This pin (see Fig. 7) projects eccentrically from a cup 51 fitting over an eccentric 52 on the motor driven shaft 45 and secured to the eccentric by a set screw 53. By adjusting the cup around the eccentric, the eccentricity of the crank pin 50 relative to the shaft may be varied so as to correspondingly change the stroke through which the pawl is reciprocated. Thus, when the shaft and pin are spaced a maximum distance apart (see Fig. 5), the pawl picks up four teeth of the ratchet wheel and turns the cam 30 one revolution in fifteen minutes. By turning the pin through a half revolution, a condition of minimum eccentricity obtains (Fig. 6) and the ratchet wheel is advanced a distance corresponding to only one tooth during each pawl stroke, the cam 30 then turning at the rate of one revolution per hour. The step-by-step advance of the cam may be adjusted as desired.

A weighted arm 54 projecting laterally from the pawl urges the latter into engagement with the ratchet teeth and acts in this manner in all lateral positions of the cam. A spring detent 55 on the cam supporting arm 36 engages the teeth of the ratchet wheel to hold the latter against reverse turning during the return stroke of the pawl.

In order to adjust the lengths of the heat "on" periods so as to proportion the supply of heat to the building in accordance with changing weather conditions and to discontinue the supply of heat completely when no heat is required in order to maintain the desired room temperature, the timing mechanism above described is adjusted automatically with changes in the temperature outside of the building. To this end, the rod 28, which supports the lever pivot 26 and is slidable transversely of the lever and parallel to the cam motion, is arranged to be actuated thermostatically by connecting it to one end of a bellows 56 whose other end is fixed to a part 57 rigid with the casing 15. The bellows communicates with a capillary tube 58 extending to a bulb 59 which may be located outside of the building. The bulb, tube, and bellows are filled with a thermally expandable fluid held under compression by a spring 60 which acts through a cup 61 between a cross pin 62 on the rod 28 and a stationary abutment 63. As a result, the pivot 26 is moved to the right as viewed in Fig. 1 as the outside temperature increases, and to the left in accordance with a decrease in the temperature of the bulb, the motion being about .004 of an inch per degree.

When the outside temperature is at 70 degrees which is the room temperature normally desired to be maintained during the daytime, the lever 25 and the follower 34 would be positioned as shown so that, with the timing cam 30 latched to the right in the daytime position, the rise 32 of the cam would not be sufficient to engage the follower and close the switch 11. At lower outside temperatures, the lever pivot 26 and the follower would be shifted proportionately to the left so that a portion of the cam rise would be effective in swinging the lever to switch-closing position about the pivot 26 and against the action of a compression spring 64 acting between the lever 25 and an arm 65 on the pivot block 27.

This engagement is terminated at a definite position in each revolution of the cam, that is, as the fall 33 is presented to the follower 34. The time of cam engagement and, therefore, closure of the switch 11 depends on the prevailing position of the follower as determined by the outside temperature, the heat "on" period then continuing until the fall 33 passes the follower. At extremely low outside temperatures, requiring continuous operation of the heater to maintain the building temperature, the cam surface never disengages the follower, the switch 11 then remaining closed continuously. The lower end of the lever 25 is guided in a slot 66 in an upturned flange 67 on the casing and may continue to move outwardly after having been moved by the cam far enough to allow the switch 11 to close.

As a result of the cyclic action above described, the heat is turned on in cool weather once during each revolution of the cam 30, and will be turned off when the fall 33 of the cam passes the follower. The lengths of the heat "on" periods are, of course, varied inversely with outside temperature changes because the extent of rotation of the cam required before the follower is engaged to close the switch 11 varies with the outside temperature.

The outside temperature at which the follower 34 is moved out of the range of the cam so that the control switch 11 remains open continuously and the heater inactive may be varied as desired by adjusting the block 27 and therefore the lever pivot 26 longitudinally of the rod 28. This adjustment is usually such that the switch will remain open when the outside temperature is at the value which it is desired to maintain in the building rooms.

In different climates, it is desirable to vary the outside temperature at which the control switch is held closed continuously by the cam 30, the heating system usually being designed for continuous operation at the lowest temperature likely to be encountered in the locality. Such adaptation of the apparatus for different climates is effected by adjusting the frame plate 17 along the ledges 19 and correspondingly loosening the clamping screw 35$^b$ and adjusting the follower 34 along the slot 35$^a$ in the lever 25. Thus, the lower the cam unit and its follower are shifted downwardly from the position shown in Fig. 1, the lower will be the outside temperature required to shift the follower 34 to a position in which it will be engaged continuously by the cam 30. Conversely, for milder climates, the cam and follower would be adjusted upwardly.

When any heat "off" period is prolonged sufficiently to allow the heating apparatus or the remote parts thereof to cool down substantially, a substantial portion of the succeeding heat "on" period might elapse before heat actually starts to be delivered to the rooms being heated. To avoid this, measurement of the heat "on" period by the timing cam 30 is interrupted as soon as the heater is turned on, provided that the remote parts of the heating apparatus have cooled below a predetermined temperature. The detection of such temperature deviation may, for example, be effected by an auxiliary thermostate 68 (Fig. 9) responsive to the temperature of a remote radiator or a remote part of the piping and having a switch 69 which remains closed until the apparatus temperature has risen above the predetermined value. The switch 69 is arranged in series with the cycling switch 11, a normally closed switch 123$^b$ (Fig. 9) to be described later, and the coil of a solenoid 70 which, when it is energized, interrupts the driving connection between the timing motor 43 and the timing cam 30. The use of the ratchet type clutch simplifies this action since the connection may be interrupted simply by swinging the pawl 49 out of engaging relation with respect to the ratchet wheel 46 whereupon the pawl continues to be reciprocated idly by the motor. For this purpose, the solenoid armature 71 is connected to an arm 72 (Fig. 9) on a rockshaft 73 carrying an arm 74 which normally lies adjacent the pawl (Fig. 1) but which, when the solenoid is energized, shifts the pawl out of engagement with the ratchet wheel as shown in Fig. 9. When, as a result of operation of the burner 12, the thermostat switch 69 is opened, the solenoid is deenergized allowing the pawl to come back into engagement with the ratchet, whereupon timing of the heat "on" period progresses. By disengaging the drive connection between the motor 43 and the timing cam, the timing motor may run continuously and be actuated for timing the operation of the program cams later to be described.

Figure 4:
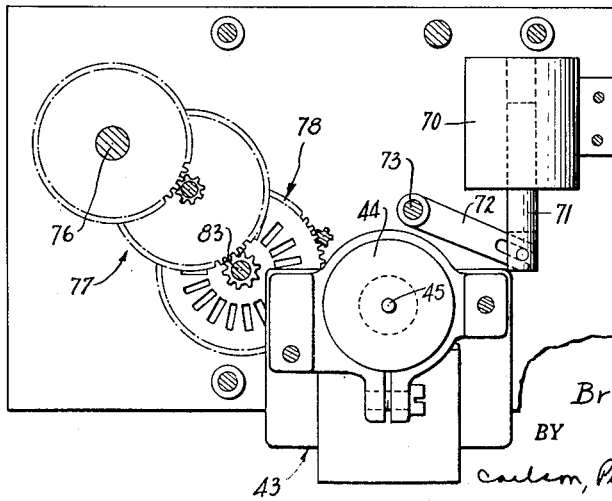
Fig. 4 is a sectional view taken below the supporting plate shown in Fig. 3.

The various control functions including night set-back, morning warm-up, and restoration of normal day control are effected by cams carried by a disk 75 on a shaft 76 which is connected through gearing 77 (Fig. 4) and a friction clutch 78 so as to be driven from the shaft 45 at the rate of one revolution each full day. This disk is graduated so as to indicate the time settings of the two program cams 79 and 80 which are loose on the shaft 76 above the disk 75 and clamped to the latter by a thumb screw 81 entered through arcuate slots in the cams. The cam 79 is utilized to effect night set-back of the cycling cam 30 at a time corresponding to the time reading on the night scale opposite a pointer 82. This time may be effected by loosening the clamping screw 81 and shifting the pointer around to any other selected hour.

By manually turning the projecting end of a shaft 83, the clutch 78 (Fig. 4) may be slipped and the program disk 75 turned independently of the motor 43 to set the disk for the proper time of day. This condition exists when the prevailing time of day as read on the program dial scale is opposite a mark 84.

Figure 2:
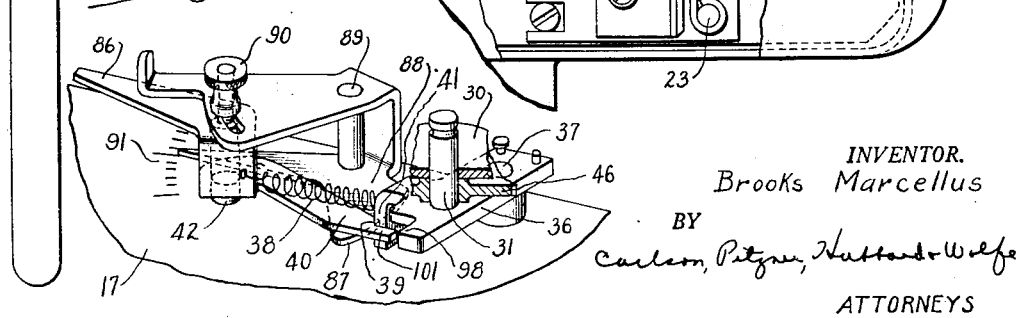
Fig. 2 is a fragmentary perspective view of certain of the parts.

Outstanding from the cam 79 is a lug 85 which at a time determined by the cam setting relative to the disk 75 engages an arm 86 on the latch lever 40 and raises the latter to lower the latch shoulder 39 and release the cam supporting arm 36 for movement to the left as viewed in Figs. 1 and 2. This motion is caused by the spring 38, and the extent of the movement is limited by engagement of the depending arm 41 (Fig. 2) with a stop surface 87 on an arm 88 pivoted on the frame plate at 89 and adjustable after loosening of a thumb screw 90 to a position indicated on a scale 91 marked on the plate 17. In this motion of the cam, the ratchet wheel 46 is moved to the left along with the cam 30, this being permitted by pivoting of the pawl against the action of the weight 54.

The effect of thus shifting the cam to the night position is to reduce the lengths of the heat "on" periods for a given position of the switch lever 25 and thereby lower the temperature which is maintained in the building at night, provided, of course, that the outdoor temperature is sufficiently lower to depress the building temperature to such lower value. After such depression of the room temperature, the cam 30 operates as before to close and open the switch by engagement and disengagement of the follower 34, the former being at a time determined by the prevailing outside temperature. As a result, the lengths of the heat "on" cycles are adjusted automatically in accordance with the outside temperature at night the same as in the daytime so that even in extremely cold weather the danger of freezing of the heating system at night is avoided. At the same time, the degree of depression of the room temperature from that maintained in the daytime may be varied as desired by adjustment of the stop 87.

Figure 3:
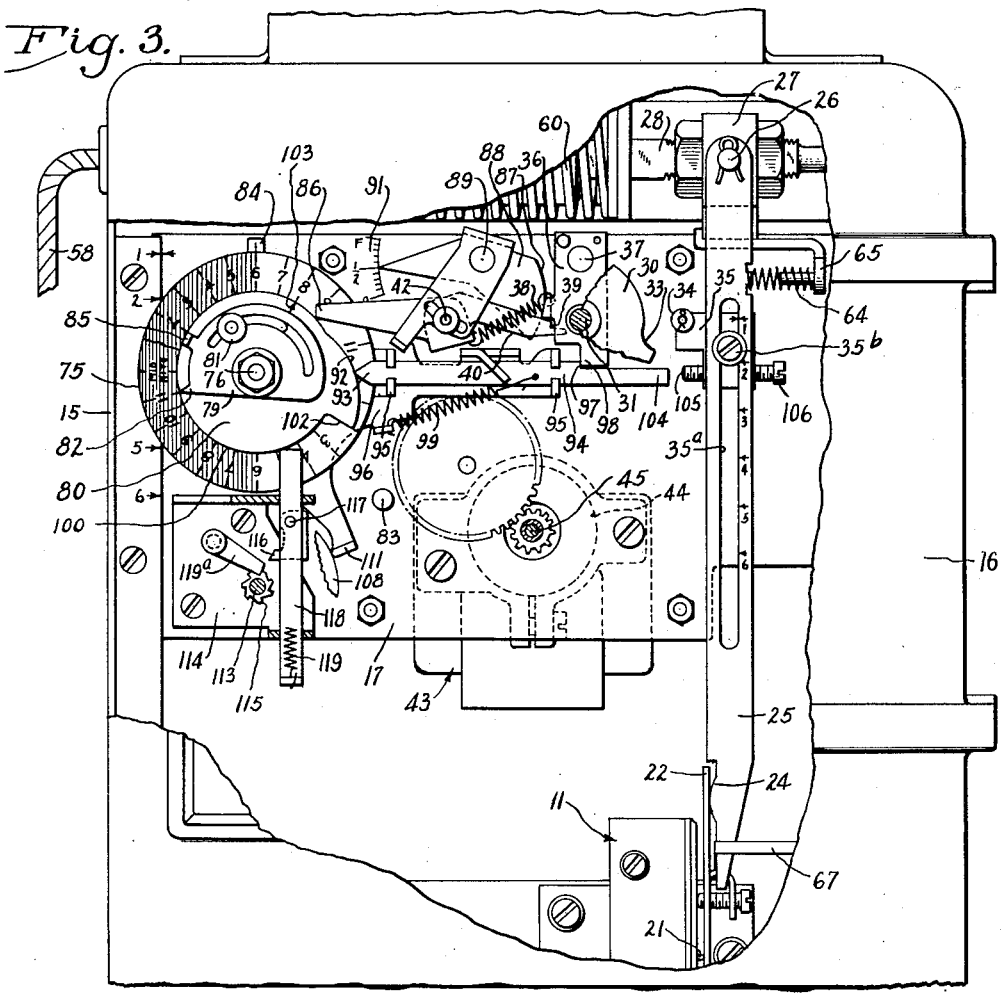
Fig. 3 is a view similar to Fig. 1, showing the parts in different positions.

Shifting of the cam back to the day position to restore normal day control is effected simply by swinging the cam supporting arm 36 to the right a distance sufficient to enable the latch 40 to move into latching position under the action of the spring 38. This is accomplished by a gradual rise 92 on the cam 80 acting on a follower 93 which constitutes the end of a push rod 94. This rod is slidable endwise in guides 95 on an arm 96 pivoted on the shaft 76 beneath the disk 75 and normally held in horizontal position as shown in Fig. 1. In this position, a shoulder 97 on the push rod is adapted for engagement with the end 98 of the cam supporting arm 36. The push rod is urged toward its cam by a spring 99 and, during substantially the entire day, the follower 93 rides against a dwell surface 100 on the cam 80. At a time each morning determined by the angular setting of the cam 80, the push rod is engaged by the cam rise 92 and shifted outwardly progressively according to the shape of the rise. In this movement, the shoulder 97 engages the latch end 98 and shifts the cam 30 and ratchet wheel assembly to the right until, as shown in Fig. 3, the arm 36 passes the shoulder 39 on the latch and allows the latter to move into active position under the action of the spring 38. The projecting end 101 of the latch allows for the overtravel of the push rod and cam assembly which is caused by the further rise of the cam 92 following resetting of the latch. When the fall 102 of the cam passes the push rod, the timing cam assembly returns to its day position in which it remains held by the latch.

It will be observed that the motion of the push rod 94 which restores day operation of the cycling mechanism is in the same direction as the switch closing movement of the lever 25 produced by the cam 30. Accordingly, the resetting mechanism is utilized to perform the additional function of actuating the control switch independently of the timing cam 30 so as to produce and time the morning warm-up period in a manner such that the building will be brought up to the normal day temperature at a predetermined time in the morning, and this irrespective of the prevailing outside temperature. This is accomplished by making the rise 92 of the resetting cam gradual and of a shape to produce a substantially linear motion of the push rod 94 and by arranging the latter to actuate the switch lever 25 and maintain the switch 11 closed continuously for a period terminating with the movement of the cam fall 102 past the follower. The latter takes place at a time corresponding to the position of a mark 103 on the cam 80 relative to the scale on the program disk 75. In the setting shown, the morning warm-up will be completed at 8:00 a. m.

Such actuation of the switch lever to override the timing cam 30 is effected by providing a projection 105 on the lever 25 in position to be engaged by the end 104 of the push rod at a time sufficiently in advance of the fall 102 to cause the proper amount of heat to be supplied to the building for restoring day temperature by the time the cam fall passes the follower. The projection 105 is the end of a screw 106 threaded through the block 35 so as to be adjustable longitudinally of the push rod motion. Being carried by the lever 25, the projection 105 thus moves back and forth with changes in the outside temperature so that the time of its engagement by the push rod and, therefore, the start of the warm-up period will vary with the outside temperature. Thus, in cold weather, as the outside temperature falls so that a longer warm-up period is required in order to attain normal day temperature within the building by the selected hour in the morning, the projection 105 will be shifted with the lever and will be engaged by the push rod earlier in the morning. Or, if the outside temperature is at or near the desired daytime building temperature, the lever 25 and the projection 105 will be carried to the right beyond the range of reciprocation of the push rod the same as the follower 34 is disposed out of the range of the timing cam 30, and no morning warm-up period will be executed. The length of the cam rise 92 measured in time is, of course, long enough to provide the proper length of continuous heater operation in the most extreme weather.

The parts are so proportioned that the push rod 94 will always engage the projection 105 before the timing cam 30, even at its highest point, will engage its follower 34. Thus, during the warmup period, the timing cam is maintained ineffectual. It turns idly until the push rod is retracted as the cam fall 102 reaches the follower 93. Then, normal day control by the cycling cam 30 is restored and the "on" and "off" periods of the heater will be executed in the normal way and modified as required in accordance with temperature changes outside of the building.

Figure 10:
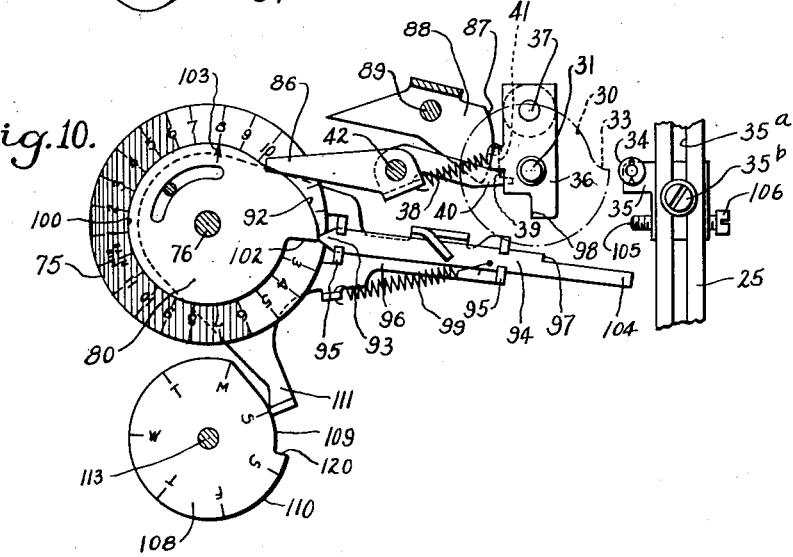
Fig. 10 is a fragmentary elevational view of the main operating parts, illustrating the different positions thereof.

In some buildings, it is desirable to maintain a reduced or night temperature over week ends. With the apparatus above described, this may be accomplished simply by disabling the restoring mechanism during the week-end period. To this end, the arm 96 which is pivoted on the shaft 76 of the program cam and supports the push rod 94 may be swung downwardly to the position shown in Fig. 10, the shoulder 97 and the end 104 of the push rod being carried out of engaging relation with respect to the timing cam arm 36 and also the projection 105. In this position, the active stroke of the push rod in the morning is made idly, and no morning warm-up period is produced, nor is the timing cam reset. As a result, night operation of the cycling apparatus is continued through the day.

Such shifting of the push rod support is controlled by a cam 108 which is rotated one revolution per week and is formed with surfaces 109 and 110 which engage a follower 111 rigid with and projecting downwardly from the arm 96 and urged by gravity against the periphery of the cam. The cam is fast on a shaft 113 journaled in the plate 17 and a bracket 114 and in this instance is actuated by the push rod actuating cam 80. For this purpose, a ratchet wheel 115 (Fig. 3) having seven teeth, one for each day of the week, is fast on the cam shaft and is actuated by a pawl 116 pivoted at 117 on a bar 118 slidable endwise in the bracket 114 to move the pawl and advance the cam one step on each downward stroke of the bar, which is urged upwardly by a spring 119. The cam is thus turned clockwise step by step and is held against reverse turning by a detent 119a.

The upper end of the bar 118 constitutes the follower of the day program cam 80 and, when engaged by the rise 92, is moved downwardly progressively, until the fall 102 passes, whereupon the bar is retracted by the spring 119. It will be observed that the bar is positioned for engagement with the cam rise at a time during the morning prior to the actuation of the push rod by the same cam.

The cam surface 110 (Fig. 10) is a dwell of such radius as to hold the follower 111 positioned with the push rod 94 in alinement with the screw 106. When the end 120 of the cam surface 110 passes the follower 111, the latter moves in against the cam surface 109 and the push rod is carried downwardly to the inactive position shown in Fig. 10 and out of engaging relation with respect to the projection 105 and the timing cam arm 36. The surface 109 is ordinarily located so that it becomes effective in the advance of the cam which occurs Sunday morning. The length of this surface is substantially equal to one step of movement of the cam so that in the Monday morning advance of the cam 108, the surface 110 is again presented to the follower 111 to restore the push rod to normal position in time for effective actuation of the arm 36 and the lever 25 to reset the timing cam and cause execution of a morning warm-up period. The cam 108 is removably held on its shaft by a clamping screw 121 which may be removed to permit replacement of the cam by a cam differently shaped to maintain the night depression over more than one day. Or, by adjusting the cam angularly, the night depression may be made to occur at any other day of the week.

The operation of the apparatus described above may be summarized as follows, assuming that the necessary adjustments have been made to adapt the apparatus to the building heater with which it is to be used in a particular climate and that the fulcrum 26 of the switch lever is adjusted in accordance with the temperature desired to be maintained in the building. If, for example, night setback of the control is to be effected at 11 o'clock each night, the cam 79 would be adjusted to bring the pointer 82 to the 11 o'clock position on the scale of the program disk. Similarly, the cam 80 would be set to locate the mark 103 in the 8 o'clock position if it is desired to bring the building up to normal day temperature by that time each morning. By turning the time setting knob 83 until the part of the scale on the program disk corresponding to the prevailing time of day is opposite the stationary mark 84, the daily program cams will be set for proper timing of the daily functions.

At 10 o'clock on Tuesday evening, the parts would be positioned as shown in Fig. 1, normal cycling of the heater being effected by engagement of the follower 34 by the timing cam 30 for "on" periods of lengths inversely proportional to the prevailing outside temperature as determined by the position of the switch lever pivot 26. Upon closure of the switch 11 to initiate any of these periods, the timing cam 30 may, if the heating apparatus is cold as evidenced by closure of the switch 69, be stopped and the "on" period increased by the interval that is required for the remote parts of the heating apparatus to attain temperature sufficient to start heating the building effectually. When this occurs, the solenoid 70 is deenergized and the drive of the timing cam is again resumed for the normal period determined by the active length of the cam surface 32.

At 11 o'clock, the lug 85 engages the latch arm 86 and retracts the latch to release the cam supporting arm 36 and allow the timing cam assembly to move to the left to the night position shown in Fig. 3 and determined by the stop surface 87. The supply of heat to the building is thus discontinued until the room temperature has, depending on the outside temperature, fallen sufficiently to permit engagement of the follower 34 by the cam 30. Thereafter, this cam effects cycling of the heater but with shorter "on" periods so as to maintain a lower temperature. As in the daytime operation, the lengths of the "on" periods are varied automatically in accordance with the outside temperature so that the depression of the room temperature continues only until a predetermined night temperature is attained and thereafter for the remainder of the night or over the week end, and the morning warm-up period is always started with the building temperature at a predetermined value.

At 4 o'clock in the morning, the rise 92 of the warm-up cam will reach the follower 93 and initiate an active or outward stroke of the push rod 94 during which the timing cam is reset as described above, beginning near the midpoint of the rise 92 as shown in Fig. 3.

At some point in the push rod stroke determined by the prevailing outside temperature, the push rod end engages the projection 105 to close the switch 11 and initiate continuous operation of the heater for morning warm-up of the building, this period continuing uninterruptedly throughout the remainder of the active stroke of the push rod, that is, until the fall 102 of the cam passes the follower 93. By starting the warm-up period at a time variable with the outside temperature and with the building, at least up to a predetermined temperature as a result of adjusting the night time cycles in accordance with the outside temperature, the amount of heat required for raising the building temperature to the day value always at a predetermined time may be measured properly by the action of the cam 92 cooperating with the switch lever 25.

About midway through the stroke of the push rod, the shoulder 97 thereon engages the arm 36 (See Fig. 3) and initiates the resetting of the timing cam. This is completed before the end of the push rod stroke, the timing cam 30 becoming latched in its day position (Fig. 1) when the push rod returns.

The cyclic operation described above takes place daily until the weekly program cam becomes effective to continue the night depression of the building temperature over a week end or other period. This occurs when, before the proper morning warm-up period, the cam surface 109 is presented to the follower 111 allowing the arm 96 to swing downwardly to the position shown in Fig. 10, thereby carrying the push rod and its shoulder 97 out of alinement with the projection 105 and the timing cam arm 36. The push rod then advances idly without resetting the timing cam or causing morning warm-up. As a result, short cycling of the heater as for night operation is continued throughout the ensuing day or until the push rod has again been restored to active position.

By automatically cycling the heater at night, as well as during the day, the danger of the heating system freezing up during the week-end depression in extremely cold weather is avoided, and the building is always conditioned for proper restoration of the desired building temperature by a normal warm-up period.

The cycling apparatus described above is readily adaptable to the control of stoker installations in which the heater must be turned on intermittently for intervals of sufficient length to hold the fire even when the normal control is conditioned to maintain the control switch 11 open continuously. To effect such hold fire control, the invention contemplates the provision of an auxiliary cam 122 (Figs. 8 and 9) on the shaft 31 rotatable in unison with the regular cycling cam 30 and acting to turn on the heater for the required interval once during each revolution, whenever, owing to the high outside temperature, the heater is either not cycled or the "on" cycles are of shorter duration than is required to hold the furnace fire. Herein, the furnace is controlled by an auxiliary contact 123a (Fig. 9) of a suitable snap acting switch 123 mounted on the frame plate 17 and having its actuating pin alined with a screw 124 adjustably mounted on a lever 125 which is pivoted at 126 on the plate 17 and projecting horizontally. When the actuating pin is released, the switch 123a is open and the switch 123b is closed, the latter being in series with the main control switch 11 and the thermostatic switch 69 by which energization of the solenoid 70 is controlled as above described. A roller 127 on the free end of the lever 125 constitutes the follower of the hold fire cam 122 which is formed with a gradual rise 128 terminating in an abrupt fall 129 which is angularly related to the timing cam 30 so as to pass its follower 127 at the same time that the fall 33 of the cycling cam passes its follower 34. In this way, the interval of burner operation, whether timed by the regular cycling cam 30 or by the hold fire cam 122, is terminated at the same time.

As the fall 129 of the hold fire cam approaches the follower 127 in each revolution of the cam shaft 31, the rise 128 will engage the follower and move the lever 125 to close the auxiliary switch 123a for an interval sufficient to hold the fire in the stoker burner and terminating as the fall 129 passes the follower. Such closure of the switch will be effective to start the stoker motor to feed fuel if, at the time of closure, the main control switch 11 has not been closed by its cam 30. Since the hold fire and cycling cams are on the same shaft and adapted to open their switches substantially simultaneously, the hold fire and regular "on" periods are properly synchronized so that the hold fire control does not vary the timing of the normal cycles when the latter are longer than the hold fire cycle. In this connection, it will be noted that the hold fire cycle is not modified by the thermostat 68 as in the case of the normal cycles, this switch controlling the burner independently.

The movement of the hold fire cam with the cycling cam 30 to effect night depression does not vary the relationship of the cam and follower sufficiently to produce any appreciable change in the timing of the hold fire cycles.

It will be apparent that the apparatus above describe is adapted for controlling any kind of heating system to maintain a constant room temperature during any part of the day combined with depression of the temperature during any part of the day and restoration of the day temperature at a predetermined time irrespective of weather conditions. Week-end depression or hold fire control may be added as required, and the entire control is, by the various adjustments described, adaptable to any kind of heating system and climate.

I claim as my invention:

1. In a time controlled actuator, the combination of a control device having two control positions, a rotary timing means operable during its rotation to cause movement of said device alternately from one position to the other, a timing motor operable continuously, a ratchet clutch for driving said timing means including a pawl disengageable from the teeth of the ratchet and continuously reciprocated by said motor to advance the ratchet step by step, an auxiliary control device for detecting conditional deviations from a predetermined value, a magnet controlling the engagement and disengagement of said pawl with said ratchet, and means controlled by the joint action of said two control devices to govern the energization and deenergization of said magnet.

2. In a time controlled actuator, the combination of a control device having two control positions, a rotary timing means operable during its rotation to cause movement of said device alternately from one position to the other, a timing motor operable continuously, a clutch for driving said timing means including a driving element continuously driven by said motor and a driven element disengageable from the driving element to interrupt the drive connection, an auxiliary control device for detecting conditional deviations from a predetermined value, and means controlled by the joint action of said two control devices to govern the engagement and disengagement of said clutch.

3. In a time controlled actuator, the combination of a control device having two control positions, a unidirectionally rotatable timing means operable during its continued rotation to cause movement of said device alternately from one position to the other, a timing motor operable continuously, a ratchet clutch for driving said timing means including a pawl disengageable from the teeth of the ratchet and continuously reciprocated by said motor to advance the ratchet step by step, a program cam rotated continuously by said motor, means actuated by cam for modifying the action of timing means in actuating said control device, condition responsive means, and means controlled by the joint action of said condition responsive means and said control device and governing the disengagement of said pawl and ratchet to interrupt the rotation of said timing means while permitting continuous rotation of said program cam by said motor.

4. In a time controlled actuator, the combination of a control device having a rotary timing means operable during its rotation to cause movement of said device alternately from one position to the other, a timing motor operable continuously, a disengageable clutch connecting said motor and timing means, a program cam rotated continuously by said motor, means actuated by said cam for modifying the action of timing means in actuating said control device, condition responsive means and means controlled by the joint action of said condition responsive means and said control device and governing the disengagement of said pawl and ratchet to interrupt the rotation of said timing means while permitting continuous rotation of said program cam by said motor.

5. In a time controlled actuator, the combination of a control device movable between different controlling positions, means for moving said device back and forth between said positions including a unidirectionally rotatable cam and a ratchet wheel, a rotary timing motor, a pawl engageable with the teeth of said ratchet wheel to turn the latter unidirectionally, means driven by said motor for reciprocating said pawl continuously to advance said ratchet wheel intermittently step by step through successive revolutions, and means by which the active strokes of said pawl may be adjusted in length to vary the speed of rotation of said ratchet wheel and thereby the lengths of the intervals in which said control device is disposed in the respective controlling positions.

6. In a time controlled actuator, the combination of a control device, a rotary cam, a ratchet wheel rotatable therewith and having teeth around its entire periphery, a follower for said cam movable alternately in opposite directions during the unidirectional turning of the cam and arranged to actuate said control device, a pawl yieldably and continuously urged into engagement with the teeth of said ratchet, a rotary eccentric connected to said pawl to reciprocate the latter, a timing motor continuously driving said eccentric to reciprocate said pawl and turn said cam unidirectionally through successive revolutions, and selectively adjustable means for varying the throw of said eccentric to correspondingly change the lengths of the intervals between actuations of said control device.

7. In a time controlled actuator, the combination of, a control device movable between different controlling positions, means for moving said device alternately back and forth between said positions including a unidirectionally rotatable timing cam, a rotary timing motor, a variable speed transmission mechanism between said motor and said cam including a ratchet wheel rotatable with the cam, a pawl engageable with the teeth of said ratchet wheel, means driven by said motor for reciprocating said pawl to advance said ratchet wheel intermittently step by step, and means by which the active strokes of said pawl may be varied in length to vary the speed of rotation of said ratchet wheel and therefore the lengths of the intervals that said control device remains in one of said positions.

8. In a time controlled actuator, the combination of a control device movable between two controlling positions, a rotary cam element and a follower element engageable therewith, said elements being relatively movable along a predetermined path during rotation of the cam element to cause movement of said device alternately back and forth between said positions, means supporting said follower element for bodily movement longitudinally of said path, means supporting said cam element for bodily movement longitudinally of said path, condition responsive means for shifting one of said elements progressively with ambient condition changes, a rotary timing motor, means driven by said motor and including a rotary program cam for shifting the other element back and forth at different times of the day, and means driven by said motor and operable to drive said cam element in its different shifted positions.

9. In a time controlled actuator, the combination of a control device movable between two controlling positions, a rotary cam element and a follower element engageable therewith, said elements being relatively movable along a predetermined path during rotation of the cam element to cause movement of said device alternately back and forth between said positions, means supporting said follower element for bodily movement longitudinally of said path, means supporting said cam element for bodily movement longitudinally of said path, condition responsive means for shifting one of said elements progressively with ambient condition changes, means by which said other element may be shifted back and forth, a rotary motor, and means operated thereby to rotate said cam element unidirectionally in all of its positions.

10. In a time controlled actuator, the combination of a control device movable between different controlling positions, a follower movable back and forth along a predetermined path to move said device between said positions, a rotary timing cam engageable with said follower, means supporting said cam for bodily movement along said path to vary the lengths of the intervals that said device is in said positions, a ratchet wheel rotatable with said cam, a rotary timing motor, a pawl engageable with the teeth of said ratchet wheel in the different shifted positions of said cam, and means driven by said motor for reciprocating said pawl to advance said ratchet wheel intermittently step by step.

11. In a time controlled actuator, the combination of a control device movable between two controlling positions, a rotary cam element and a follower element engageable therewith, said elements being relatively movable along a predetermined path during rotation of the cam element to cause movement of said device alternately back and forth between said positions, a rotary timing motor, means driven thereby for rotating said cam element, means supporting one of said elements for separable bodily movement along said path to vary the duration of the intervals in which said device is disposed in said positions, and means driven by said motor and operable to move said shiftable element back and forth at different times of the day to thereby vary the positional relation of the cam and follower elements.

12. In a time controlled actuator, the combination of a control device movable between two controlling positions, a rotary cam element and a follower element therefor swingable about a pivotal axis paralleling the axis of said cam element, means actuated by relative movement between said elements during rotation of the cam element to cause movement of said control device alternately back and forth between said positions, means supporting the axis of one of said elements to shift bodily relative to the other element in the direction of the motion of the follower element by the cam element to thereby vary the duration of the intervals that said device is in said positions, said shiftable element being normally urged in one direction, and a latch adapted when in active position to hold the axis of said shiftable element in one position and releasable to permit movement of such axis to a different position.

13. In a time controlled actuator, the combination of a control device movable between two controlling positions, a rotary cam element and a follower element therefor movable back and forth along a predetermined path during rotation of the cam element, means actuated by relative movement between said elements during rotation of the cam element to cause movement of said control device alternately back and forth between said positions, means supporting one of said elements to shift bodily relative to the other element along a path extending longitudinally of said first mentioned path whereby to vary the duration of the intervals that said device is in said positions without changing the frequency of the movements of said follower element, said shiftable element being normally urged in one direction along said second path, a latch adapted when in active position to hold said shiftable element in a set position and releasable to permit movement of the element along said second path to a different position, a rotary timing member, and means actuated thereby to withdraw said latch at a predetermined time and thereupon release the shiftable element for movement along said second path.

14. In a time controlled actuator, the combination of a control device movable between two controlling positions, a rotary cam element and a follower element therefor movable back and forth along a predetermined path during rotation of the cam element, means actuated by relative movement between said elements during rotation of the cam element to cause movement of said control device alternately back and forth between said positions, means supporting one of said elements to shift bodily relative to the other element along a path extending longitudinally of said first mentioned path whereby to vary the duration of the intervals that said device is in said positions without changing the frequency of the movements of said follower, said shiftable element being normally urged in one direction along said second path, a latch adapted when in active position to hold said shiftable element in a set position and releasable to permit movement of the element along said second path to a different position, a rotary timing member, means actuated thereby to release said latch at a predetermined time, and means also actuated by said member to reset the latch and restore the position of said shiftable element at a different time.

15. In a time controlled actuator, the combination of a control device, a rotary cam element coacting with a follower element to cause actuation of said device intermittently, means supporting one of said elements for bodily shifting relative to the other element, said shiftable element being yieldably urged in one direction, a latch for holding said shiftable element in a predetermined position and releasable to permit movement thereof to a different position, a rotary timing member, means actuated thereby to release said latch at a predetermined time, a reciprocable push rod actuated by said timing member at a different time, and means operable during the active stroke of said push rod to reset said latch.

16. In a time controlled actuator, the combination of a control device, timing mechanism operable to actuate said control device intermittently to define different time intervals, means for varying the positional relation of said elements to change the relative lengths of said intervals including a member urged in one direction, a latch engageable with said member to hold the latter against such movement, a rotary timing element, means actuated by said element to release said latch at a predetermined time, an arm swingable about the axis of said timing element, a cam on said element, a follower for said cam movably mounted on said arm and normally operable when actuated to reset said latch, and means by which said arm may be shifted to move said follower to an inactive position whereby to prevent resetting of the latch during the subsequent actuation of said follower by said cam.

17. In a time controlled actuator, the combination of a control device, timing mechanism operable to actuate said control device intermittently to define different time intervals, means for varying the positional relation of said elements to change the relative lengths of said intervals including a member urged in one direction, a latch engageable with said member to hold the latter against such movement, a rotary timing element, means actuated by said element to release said latch at a predetermined time, a cam on said element, a follower actuated by said cam, means actuated by said follower and normally operable to reset said latch, an auxiliary timing cam and a follower therefor, and means actuated by the latter follower to disable said resetting means during certain of the actuations of said first follower.

18. In a time controlled actuator, the combination of a control device having two control positions, a lever for actuating said device and urged toward a normal position, a follower on said lever, a rotary timing cam engageable with said follower and operable to move said lever out of said position for spaced time intervals, a member supporting said cam for movement toward and away from said lever to change the lengths of said intervals, a latch engageable with said member to hold the cam in one position and releasable to allow movement thereof to another position, a rotary timing element operable to release said latch at a predetermined time, and means actuated by said timing element at a different time to restore the member and cam to said one position, to reset said latch, and to move said lever independently of the cam out of said normal position for a predetermined period.

19. In a time controlled actuator, the combination of a control device having a normal position and shiftable to a second position, a rotary timing cam, follower means operated thereby to move said device to said second position for spaced time intervals, a member adapted when actuated to change the positional relation of said cam and follower means and thereby reduce the lengths of said intervals, a rotary program element for actuating said member at a predetermined time each day, a cam on said program element, a follower movable forwardly and then backwardly by said second cam at a time subsequent to the actuation of said member, and means operable in the forward stroke of said follower to reset said first cam and said follower means and also to move said control device to said second position independently of said first cam, said last mentioned means on the return stroke of the follower restoring said follower means to the control of its cam.

20. In a time controlled actuator, the combination of a control device having a normal position and shiftable to a second position, a rotary timing cam, follower means operated thereby to move said device to said second position for spaced time intervals, a member adapted when actuated to change the positional relation of said cam and follower means and thereby reduce the lengths of said intervals, a rotary program element for actuating said member at a predetermined time each day, a cam on said program element, a follower movable forwardly and then backwardly by said second cam at a time subsequent to the actuation of said member, means operable in the forward stroke of said follower to reset said first cam and said follower means and also to move said control device to said second position independently of said first cam, said last mentioned means on the return stroke of the follower restoring said follower means to the control of its cam, an auxiliary slower operating program element, and means actuated by the latter element at a certain time of the week to disable said last mentioned means during the active stroke of said follower whereby to maintain the reduced length of said time intervals until the subsequent day.

21. In a time controlled actuator, the combination of a control device normally in one position and movable to a second position, a rotary timing cam having a gradual rise followed by a fall, a follower member engageable by said cam rise to move said device to said second position and maintain the same therein for the remainder of the rise, condition responsive means for varying the point of actuation of said follower by said rise and thereby change the duration of the interval that said device is in said second position, an auxiliary control device connected in parallel with said first device for performing the same function as the latter when moved out of a normal position to a second position, an auxiliary cam rotatable with said first cam and having a gradual rise terminating at an abrupt fall, and a follower for said auxiliary cam positioned for engagement with a predetermined point on the rise thereof and operable to move said auxiliary control device to its second position for the remainder of the cam rise, the falls on both of said cams being presented to said followers substantially simultaneously.

22. In a time controlled actuator, the combination of a control device normally in one position and movable to a second position, a rotary timing cam having a gradual rise followed by a fall, a follower member engageable by said cam rise to move said device to said second position and maintain the same therein for the remainder of the rise, condition responsive means for varying the point of actuation of said follower by said rise and thereby change the duration of the interval that said device is in said second position, an auxiliary control device connected in parallel with said first device for performing the same function as the first device when moved out of a normal position to a second position, an auxiliary cam rotatable with said first cam, and a followered actuated by said auxiliary cam to move said auxiliary control device to said second position invariably at a predetermined time ahead of the passage of said first cam fall past said first follower and to maintain the second position of said auxiliary device until said cam fall passes its follower.

23. In a time controlled actuator, the combination of, a control device having two controlling positions, a lever swingable about its fulcrum out of a normal position to move said device from one position to the other, a follower on said lever spaced from said fulcrum, a rotary timing cam having a gradual rise terminating in an abrupt fall and engageable with said follower to move said lever and control device alternately back and forth between said positions, condition responsive means for shifting said fulcrum laterally of the lever and in the direction of the follower motion to vary the duration of the intervals that said device is in said positions, and means by which said cam and follower may be adjusted toward and away from said fulcrum to vary the position of said fulcrum at which said device is held continuously in one of said positions.

24. In a mechanism of the character described, the combination of, a follower element fulcrumed to swing about an axis extending transversely of the element, a rotary cam element engageable with said follower element in its rotation to swing the latter back and forth about said axis, condition responsive means for shifting said axis laterally to thereby vary the duration of the effective engagement between said elements in each revolution of said cam element, an arm rotatably supporting said cam element thereon, means supporting said arm on an axis spaced from and paralleling said first axis to swing toward and away from the said follower element, and timing mechanism for swinging said arm back and forth to thereby vary the positional relation of said cam and follower elements.

25. In a mechanism of the character described, the combination of a swingable follower element, a rotary cam element engageable with said follower element in its rotation to swing the latter back and forth, condition responsive means for shifting the axis of said follower element laterally to thereby vary the duration of the effective engagement between said cam and follower elements in each revolution of said cam element, a member rotatably supporting said cam element thereon and mounted for movement back and forth in the direction of the movement of said follower element by the cam element, and timing mechanism for moving said member back and forth to thereby vary the positional relation of said cam and follower elements.

26. In a time controlled actuator, the combination of, a control device movable between two controlling positions, a rotary cam element, a follower element therefor movable back and forth along a predetermined path by rotation of the cam element, means actuated by relative movement between said elements during rotation of the cam element to cause movement of said control device alternately back and forth between said positions, a member supporting one of said elements to shift bodily relative to the other element along a path extending longitudinally of said first mentioned path, a second member supporting the other element to shift bodily along a path extending longitudinally of said first path, condition responsive means for shifting one of said members back and forth along its path, and a rotary timing mechanism operable to shift said other member predetermined increments back and forth along its path.

BROOKS MARCELLUS.

REFERENCES CITED

The following references are of record in the file of this patent:

UNITED STATES PATENTS

| Number | Name | Date |
| --- | --- | --- |
| 1,732,702 | Tannehill | Oct. 22, 1929 |
| 1,812,897 | Owens | July 7, 1931 |
| 2,315,920 | Baker et al. | Apr. 6, 1943 |
| 2,373,186 | Isserstedt | Apr. 10, 1945 |